United States Patent
Lange et al.

(10) Patent No.: US 10,855,128 B2
(45) Date of Patent: Dec. 1, 2020

(54) METHOD FOR PRODUCING A STATOR

(71) Applicant: Dr. Ing. h.c. F. Porsche Aktiengesellschaft, Stuttgart (DE)

(72) Inventors: Johannes Lange, Wiernsheim (DE); Tobias Engelhardt, Stuttgart (DE); Stefan Schmitz, Vaihingen (DE); Axel Heitmann, Ditzingen (DE); Jan Nägelkrämer, Stuttgart (DE); Stefan Oechslen, Ludwigsburg (DE); Daniel Knoblauch, Ludwigsburg (DE); Wolfgang Thaler, Leutkirch (DE); Stefan Heinz, Leutkirch (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 181 days.

(21) Appl. No.: 15/844,771

(22) Filed: Dec. 18, 2017

(65) Prior Publication Data
US 2018/0175690 A1 Jun. 21, 2018

(30) Foreign Application Priority Data
Dec. 19, 2016 (DE) .................. 10 2016 124 799

(51) Int. Cl.
*H02K 15/00* (2006.01)
*H02K 3/12* (2006.01)
(Continued)

(52) U.S. Cl.
CPC ............... *H02K 3/12* (2013.01); *H02K 3/50* (2013.01); *H02K 15/0414* (2013.01); *H02K 15/064* (2013.01); *Y10T 29/49009* (2015.01)

(58) Field of Classification Search
CPC .......... H01F 6/06; H01F 41/071; H01F 41/04; Y10T 29/4902; Y10T 29/49009;
(Continued)

(56) References Cited

U.S. PATENT DOCUMENTS 5,787,567 A  8/1998  Miyazaki
6,649,844 B2  11/2003  Kusumoto et al.
(Continued)

FOREIGN PATENT DOCUMENTS

CA  2135566 A1  6/1995
CN  1136232 A  11/1996
(Continued)

OTHER PUBLICATIONS

Indian Examination Report for Indian Application No. 201714041798, dated Sep. 30, 2019, with translation, 6 pages.
(Continued)

*Primary Examiner* — Thiem D Phan
(74) *Attorney, Agent, or Firm* — RatnerPrestia

(57) ABSTRACT

Described is a method for producing a stator, in particular for electric motors. In a first step, a plurality of flexible electrical conductors are combined to form a conductor bundle. In a second step, two end regions of the conductor bundle are pressed in such a way that a central region of the conductor bundle formed between the two end regions remains flexible. Also described is a corresponding stator.

6 Claims, 1 Drawing Sheet

(51) Int. Cl.
*H02K 15/06* (2006.01)
*H02K 15/04* (2006.01)
*H02K 3/50* (2006.01)

(58) Field of Classification Search
CPC ........ Y10T 29/49073; Y10T 29/49071; H02K 15/0414; H02K 15/0421; H02K 3/14; H02K 15/064
USPC .......... 29/596, 598, 604, 605, 606, 732, 735
See application file for complete search history.

(56) References Cited

U.S. PATENT DOCUMENTS

| | | | |
|---|---|---|---|
| 6,833,648 B2 | 12/2004 | Gorohata et al. | |
| 8,344,573 B2 | 1/2013 | Hasegawa et al. | |
| 10,128,728 B2* | 11/2018 | Hirao | H02K 15/0414 |
| 2010/0001609 A1 | 1/2010 | Ishigami et al. | |
| 2013/0192057 A1 | 8/2013 | Koga | |
| 2014/0117805 A1 | 5/2014 | Hagiwara et al. | |

FOREIGN PATENT DOCUMENTS

| | | |
|---|---|---|
| CN | 102136772 B | 2/2013 |
| CN | 103609000 B | 5/2016 |
| DE | 1489900 A1 | 11/1970 |
| DE | 4344044 A1 | 6/1995 |
| DE | 69600398 T2 | 1/1999 |
| DE | 10113831 A1 | 2/2002 |
| DE | 60306850 T2 | 9/2007 |
| EP | 0727867 A1 | 6/1996 |
| EP | 1930918 A2 | 6/2008 |
| EP | 1573881 B1 | 7/2013 |
| GB | 1079815 A | 8/1967 |
| JP | H05504018 A | 6/1993 |
| JP | 2001155935 A | 6/2001 |
| JP | 2004274901 A | 9/2004 |
| JP | 2008148375 A | 6/2008 |

OTHER PUBLICATIONS

Chinese Office Action for Chinese Application No. 201711292829.3, dated Jul. 1, 2019, with translation, with translation, 13 pages.
Notice of Reasons for Refusal for Japanese Application No. 2017-240385, dated Jul. 17, 2019, with translation, 6 pages.
German Search Report for German Application No. 10 2016 124 799.5, dated Sep. 1, 2017, including partial English translation, 14 pages.
Notification of Reasons for Refusal for Japanese Application No. 2017-240385, dated Nov. 21, 2018, with translation, 7 pages.
Chinese Office Action for Chinese Application No. 201711292829.3, dated Dec. 25, 2019 with translation, 12 pages.

* cited by examiner

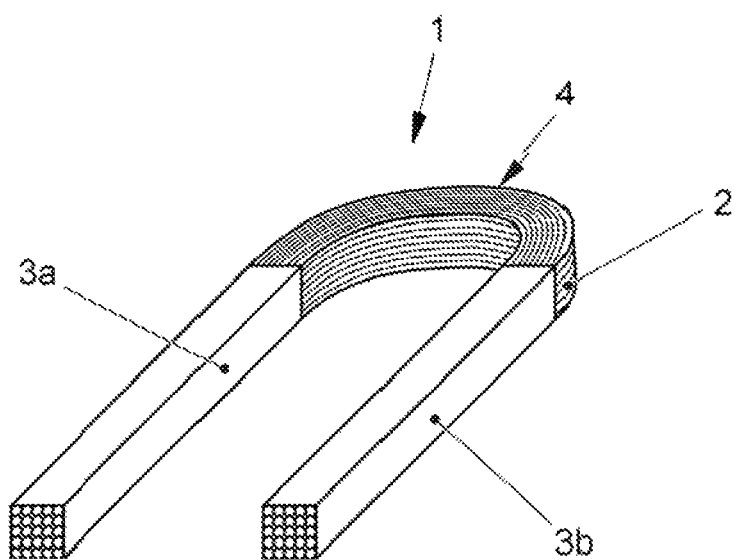

METHOD FOR PRODUCING A STATOR

CROSS-REFERENCE TO RELATED APPLICATIONS

This application claims priority to German Patent Application No. DE 10 2016 124 799.5, filed Dec. 19 2016, which is incorporated by reference herein in its entirety.

FIELD OF THE INVENTION

The present invention relates to a stator and a method for producing a stator, in particular for electric motors.

BACKGROUND OF THE INVENTION

Stators are known from the prior art. Stators are usually equipped with stator coils. Various winding techniques for stator coils are known from the prior art, including needling, flyer, hairpin or pull-in techniques. In hairpin technology, the winding head of the stator coil is constructed from hairpin conductors. Hairpin conductors, also referred to as hairpins for short are known from the prior art. Said hairpin conductors are conductors that are bent in a U-shaped manner and have two open ends. The central subregion, that is to say the closed end of the conductor, is referred to as the head. In hairpin technology, particularly the bending of the conductor at the closed end, that is to say at the head of the hairpin, is demanding in terms of manufacturing technology and costly.

SUMMARY OF THE INVENTION

Described herein is a production method for a stator, wherein the stator has at least one stator coil that is wound using hairpin technology, wherein the production method is less demanding in terms of manufacturing technology and costly than previous production methods.

Also described herein is a stator with hairpin winding that is comparatively cost-effective and simple to produce.

Describe is a method for producing a stator, in particular for electric motors, wherein, in a first step, a plurality of flexible electrical conductors are combined to form a conductor bundle and wherein, in a second step, two end regions of the conductor bundle are pressed in such a way that a central region of the conductor bundle formed between the two end regions remains flexible.

The method advantageously provides a conductor bundle that can be used as a hairpin having a flexible head.

Using a plurality of flexible electrical conductors in the first step of the production method preferably provides a hairpin that is flexible across the entire hairpin length in comparison with the classic hairpin.

In the second step, said flexible hairpin is pressed at two end regions of the hairpin in such a way that a central region formed between the two end regions remains flexible. This restricts the flexibility of the hairpin, which is achieved by the production from a plurality of flexible electrical conductors, to a subregion of the hairpin, namely a central subregion of the hairpin. In the following text, the central subregion of the hairpin is referred to as the head.

A production method for a hairpin having a flexible head is advantageously provided thereby. The head of the hairpin can thereby advantageously be adapted easily to the geometry of the stator.

This enables savings in the bending step during stator winding, which is demanding in terms of manufacturing technology and hence costly. A comparatively simple and cost-effective method for producing a stator is thereby provided.

In one preferred embodiment of the present invention, the flexible electrical conductor is embodied as a litz wire. In the context of the present invention, a litz wire refers to an electrical conductor consisting of individual wires. These individual wires are preferably thin and made from copper. In the text that follows, the hairpin produced from a plurality of litz wires is referred to as a pressed litz-wire hairpin having a flexible head.

In a further preferred embodiment of the present invention, the end regions of the conductor bundle are pressed with supply of heat.

In one preferred embodiment of the present invention, in a third step, at least one winding head of the stator is fitted with the pressed conductor bundles.

In one preferred embodiment of the present invention, in a fourth step, the winding head is embossed against the stator laminated core by means of a winding head embossing apparatus.

It is thereby preferably possible to reduce the winding head to a minimum winding head length and hence a minimum winding head volume.

In a further preferred embodiment of the present invention, during the winding head embossing step, the winding head is permanently mechanically fixed. In one preferred embodiment of the present invention, during the winding head embossing step, the winding head is permanently mechanically fixed by means of cementing.

A further subject of the present invention is a stator, in particular for electric motors, wherein the stator has at least one winding head element, wherein the winding head element has a conductor bundle, wherein the conductor bundle has a plurality of flexible electrical conductors, wherein two end regions of the conductor bundle are pressed and a central region of the conductor bundle formed between the end regions is flexible.

This preferably provides a wound stator that is comparatively simple and cost-effective to produce using the hairpin method.

In one preferred embodiment, the flexible electrical conductors are embodied as litz wires.

A litz-wire hairpin that leas been pressed into shape and the head of which remains flexible is thereby provided. The litz-wire hairpin can advantageously be installed in the further processing of the litz-wire hairpin having a flexible head, in particular during winding of the stator, on account of the flexible head and with the aid of an appropriate winding head embossing apparatus. In particular, it is preferably possible to design the winding head advantageously with respect to installation space, that is to say volume of the winding head or winding head length. In particular, it is possible to provide a winding head having a minimum winding head length by way of hairpin winding using the pressed litz-wire hairpins having a flexible head.

In one preferred embodiment of the present invention, the flexible electrical conductors each have an insulation means.

Insulating the conductors from one another advantageously prevents undesired currents between the conductors.

In one preferred embodiment, the conductor bundle has a plurality of litz wires that are insulated from one another.

BRIEF DESCRIPTION OF THE DRAWING

Further details, features and advantages of the invention emerge from the drawings and from the following description of preferred embodiments with reference to the drawings.

Here, the drawings illustrate merely exemplary embodiments of the invention, which do not restrict the concept of the invention.

The sole FIGURE schematically illustrates a pressed litz-wire hairpin having a flexible head in accordance with the present invention.

DETAILED DESCRIPTION OF THE INVENTION

The sole FIGURE schematically shows a pressed litz-wire hairpin 1 having a flexible head 4 in accordance with the present invention. The litz-wire hairpin is a conductor consisting of a composite assembly of a plurality of litz wires. The individual litz wires 2 are insulated from one another. The litz-wire hairpin 1 is designed in a U-shaped manner, that is to say the litz-wire hairpin 1 has two end regions 3a and 3b and a central subregion, the so-called head 4 of the litz-wire hairpin 1. In one preferred embodiment of the present invention, the two end regions 3a and 3b of the litz-wire hairpin 1 are pressed. The head 4 of the litz-wire hairpin is not pressed and remains flexible. Thus, the head 4 is more flexible than the end regions 3a and 3b of the litz-wire hairpin 1.

What is claimed is:

1. A method for producing a stator for electric motors, the stator having at least one stator coil that is round using hairpin technology, and a winding head of the stator coil that is constructed from hairpin conductors in a U-shape manner, said method comprising the steps of:

combining a plurality of flexible electrical conductors to form a conductor bundle;

bending the plurality of flexible electrical conductors to form a curved central region and two end regions extending from opposite ends of the curved central region; and pressing the two end regions of the conductor bundle to form two pressed end regions in such a way that the curved central region of the conductor bundle formed between the two pressed end regions is not pressed and has a greater flexibility than the pressed end regions such that a pressed litz-wire hairpin having a flexible head is formed, wherein each pressed end region has a greater length than the central region, and wherein each pressed end region intersects the curved central region.

2. The method as claimed in claim 1, wherein the end regions of the conductor bundle are pressed with a supply of heat.

3. The method as claimed in claim 1, further comprising fitting at least one winding head of the stator with the pressed conductor bundles.

4. The method as claimed in claim 3, further comprising embossing the winding head against a laminated core of the stator using a winding head embossing apparatus.

5. The method as claimed in claim 4, further comprising permanently mechanically fixing the winding head during the winding head embossing step.

6. The method as claimed in claim 5, wherein the step of permanently mechanically fixing comprises cementing.

\* \* \* \* \*